United States Patent
Hattori et al.

(10) Patent No.: US 10,639,759 B2
(45) Date of Patent: May 5, 2020

(54) LOAD STATE DIAGNOSIS DEVICE AND LOAD STATE DIAGNOSIS METHOD FOR SERVOMOTOR

(71) Applicant: OMRON Corporation, Kyoto (JP)

(72) Inventors: Reiko Hattori, Kyoto (JP); Takayoshi Matsuyama, Kusatsu (JP); Toru Fujii, Kyoto (JP)

(73) Assignee: OMRON Corporation, Kyoto (JP)

( * ) Notice: Subject to any disclaimer, the term of this patent is extended or adjusted under 35 U.S.C. 154(b) by 9 days.

(21) Appl. No.: 16/162,411

(22) Filed: Oct. 17, 2018

(65) Prior Publication Data
US 2019/0184511 A1    Jun. 20, 2019

(30) Foreign Application Priority Data
Dec. 15, 2017   (JP) .................................. 2017-240675

(51) Int. Cl.
| | | |
|---|---|---|
| *H02P 6/30* | (2016.01) | |
| *B23Q 11/04* | (2006.01) | |
| *B23Q 17/09* | (2006.01) | |
| *G05B 19/4062* | (2006.01) | |

(52) U.S. Cl.
CPC .......... *B23Q 11/04* (2013.01); *B23Q 17/0961* (2013.01); *G05B 19/4062* (2013.01); *G05B 2219/37632* (2013.01); *G05B 2219/42295* (2013.01); *G05B 2219/42321* (2013.01)

(58) Field of Classification Search
CPC ................ B23Q 11/04; B23Q 17/0961; G05B 2219/37632
See application file for complete search history.

(56) References Cited

U.S. PATENT DOCUMENTS

| | | | | |
|---|---|---|---|---|
| 5,637,968 A | * | 6/1997 | Kainec .................. | B23P 19/066 19/66 |
| 6,057,661 A | | 5/2000 | Iwashita | |
| 2001/0053952 A1 | * | 12/2001 | Kodaka ............... | B62D 5/0484 701/43 |
| 2006/0142893 A1 | | 6/2006 | Yasugi et al. | |
| 2007/0052383 A1 | | 3/2007 | Abe et al. | |

FOREIGN PATENT DOCUMENTS

| | | |
|---|---|---|
| EP | 0926577 | 6/1999 |
| JP | H10235538 | 9/1998 |
| JP | 2000107987 | 4/2000 |
| JP | 2002001633 | 1/2002 |

OTHER PUBLICATIONS

"Search Report of Europe Counterpart Application", dated May 9, 2019, p. 1-p. 7.

* cited by examiner

*Primary Examiner* — Cortez M Cook
(74) *Attorney, Agent, or Firm* — JCIPRNET

(57) ABSTRACT

There are provided a load state diagnosis device and a load state diagnosis method for a servomotor. A PLC diagnoses the load state of the servomotor which rotationally drives a rotary tool in a predetermined rotational drive direction at a constant speed. The PLC includes a detection part that detects the rotational direction of a torque acting on the servomotor, a determination part that determines whether the rotational direction of the torque detected by the detection part is consistent with the predetermined rotational drive direction, and a load index output part that outputs a load index indicating the load state of the servomotor based on a determination result of the determination part.

16 Claims, 12 Drawing Sheets

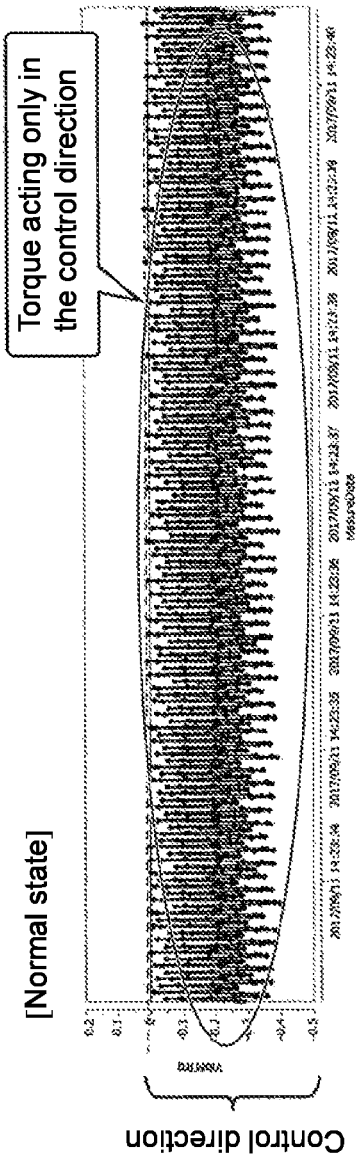
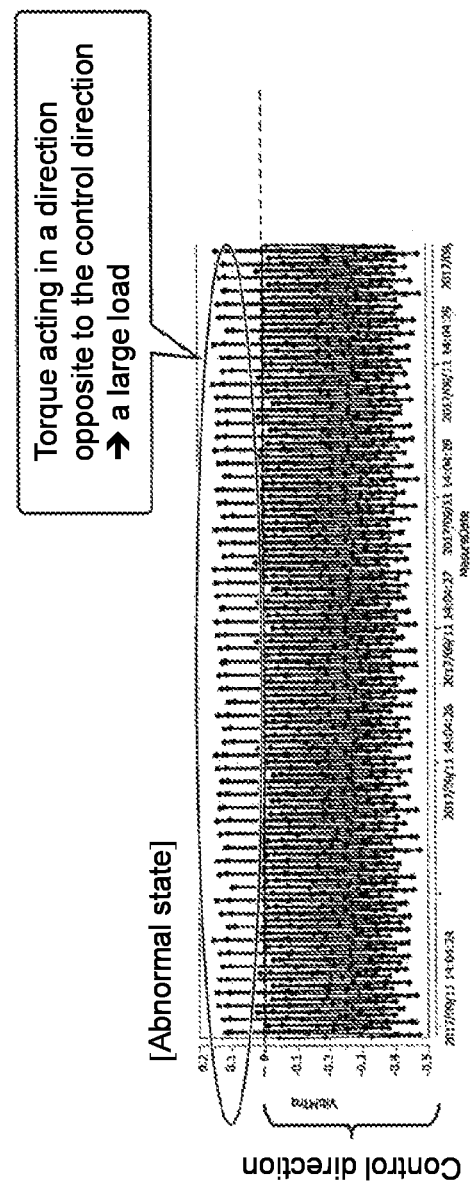
FIG. 4A
FIG. 4B

| Gain | Speed standard deviation | Load index |
|---|---|---|
| Small | 1.1 | 91.2 |
| Medium | 0.9 | 46.8 |
| Large | 0.2 | 287.1 |

FIG. 9

LOAD STATE DIAGNOSIS DEVICE AND LOAD STATE DIAGNOSIS METHOD FOR SERVOMOTOR

CROSS-REFERENCE TO RELATED APPLICATION

This application claims the priority benefit of Japan Patent Application No. 2017-240675, filed on Dec. 15, 2017. The entirety of the above-mentioned patent application is hereby incorporated by reference herein and made a part of this specification.

BACKGROUND

Technical Field

The disclosure relates to a load state diagnosis device and a load state diagnosis method for a servomotor for diagnosing a load state of the servomotor that rotationally drives a rotary tool in a predetermined rotational drive direction at a constant speed.

Description of Related Art

Conventionally, there is known an abnormality detection device for detecting an abnormality before a rotary tool is damaged so as to prevent damage.

For example, Patent Document 1 discloses a technique of detecting an abnormality of a rotary tool on the basis of a threshold based on a damage load level or a load change rate corresponding to the rotary tool by detecting the load of the rotary tool. In this way, an abnormality may be appropriately detected in real time in response to variations and sudden changes of the load.

In addition, for example, Patent Document 2 discloses a technique which digitally collects a load signal of a drive shaft of a machine tool, and if a characteristic amount such as a calculated differential or a difference from a moving average satisfies a predetermined condition, determines it as an abnormality. In this way, a detection device with high sensitivity in real time regardless of fluctuations of processing conditions can be realized.

Further, for example, Patent Document 3 discloses a technique of determining an abnormality when a load detected by a drive source of a processing machine exceeds a threshold determined by a load average of the past few times. In this way, an abnormality determination applicable to both the start-up and continuous operation of the processing machine may be realized.

RELATED ART

Patent Document

[Patent Document 1] Japanese Laid-open No. H10-235538 (published on Sep. 8, 1998)
[Patent Document 2] Japanese Laid-open No. 2000-107987 (published on Apr. 18, 2000)
[Patent Document 3] Japanese Laid-open No. 2002-1633 (published on Jan. 8, 2002)

Conventional abnormality detection devices all focus on relative values (comparison between normal time and abnormal time) of the load (indicating the torque and substantially proportional to the drive current) of the rotary machine or focus on the change rate of the load to detect an abnormality. However, with this detection method, whether each state of the rotary machine is abnormal cannot be absolutely evaluated. For this reason, since a user has to consider and set a threshold of a normal state and a threshold of an abnormal state respectively, the determination standard becomes ambiguous and has a problem of being impractical.

SUMMARY

A load state diagnosis device for a servomotor according to an embodiment of the disclosure is the load state diagnosis device for the servomotor for diagnosing a load state of the servomotor which rotationally drives a rotary tool in a predetermined rotational drive direction at a constant speed, characterized in including a detection part that detects a rotational direction of a torque acting on the servomotor; a determination part that determines whether or not the rotational direction of the torque detected by the detection part is consistent with the predetermined rotational drive direction; and a load index output part that outputs a load index indicating the load state of the servomotor based on a determination result of the determination part.

A load state diagnosis method for a servomotor according to an embodiment of the disclosure is the load state diagnosis method for the servomotor for diagnosing a load state of the servomotor which rotationally drives a rotary tool in a predetermined rotational drive direction at a constant speed, characterized in including a detection process of detecting a rotational direction of a torque acting on the servomotor; a determination process of determining whether or not the detected rotational direction of the torque is consistent with the predetermined rotational drive direction; and a load index output process of outputting a load index indicating the load state of the servomotor based on a determination result.

BRIEF DESCRIPTION OF THE DRAWINGS

FIG. 4A is a diagram showing a torque waveform when the servomotor is normal.

FIG. 4B is a diagram showing a torque waveform when the servomotor is abnormal.

FIG. 9 is a diagram showing an embodiment of the relationship between the values of the control gain of the servomotor and the speed standard deviation and the load index of the servomotor for different values.

DESCRIPTION OF THE EMBODIMENTS

Figure 1:
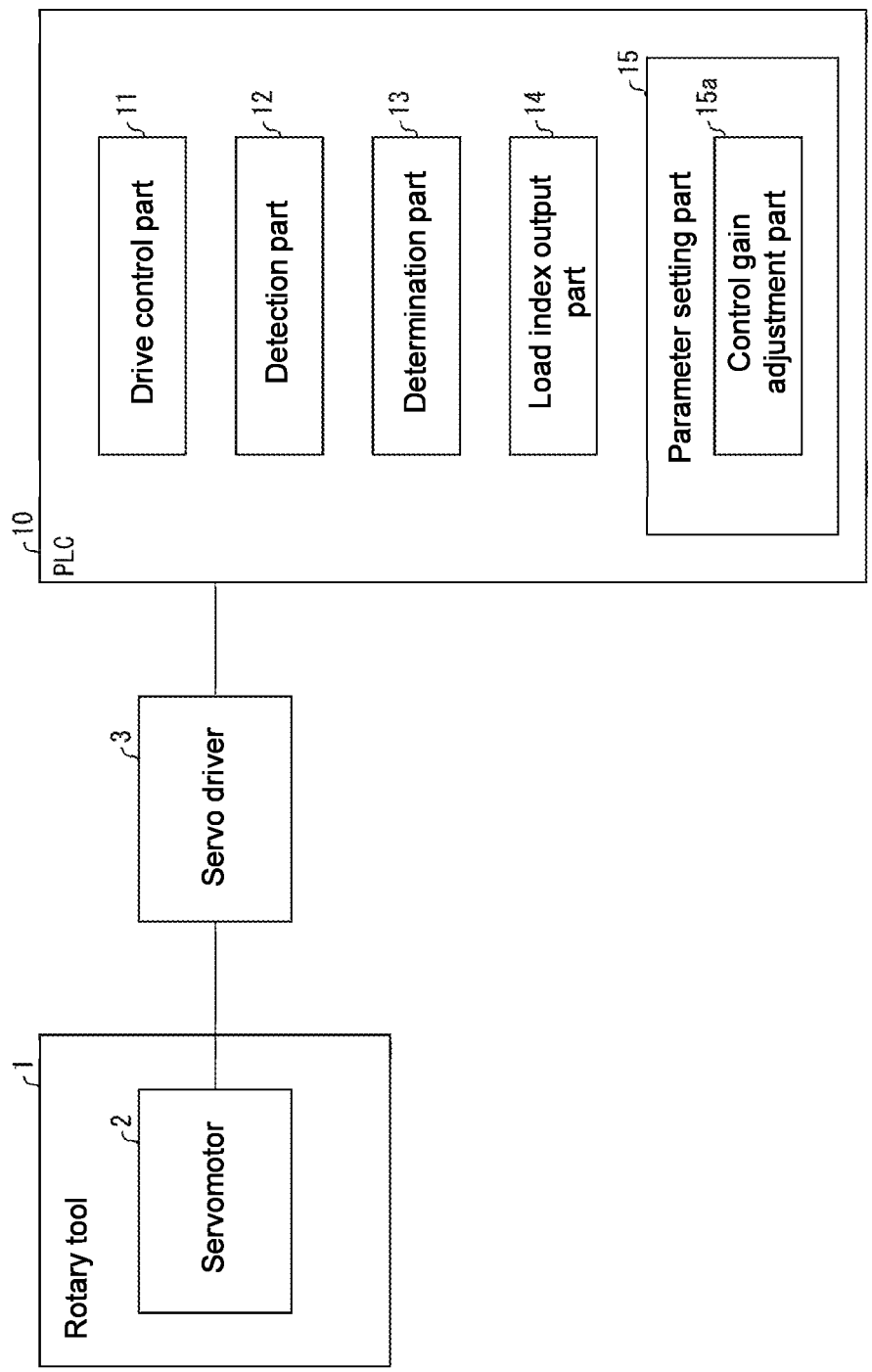
FIG. 1 is a block diagram showing a configuration of a load state diagnosis device for a servomotor according to an embodiment of the disclosure.

An embodiment of the disclosure provides a load state diagnosis device and a load state diagnosis method for a servomotor that can diagnose the present load state of the servomotor with an absolute evaluation index regardless of types of rotary tools, processing conditions and differences in machines.

Conventionally, an abnormality is detected by focusing on relative values (comparison between normal time and abnormal time) of the load (indicating the torque and substantially proportional to the drive current) of the rotary tool or focusing on the change rate; therefore, there is a problem that the abnormality of each state cannot be absolutely evaluated.

When a torque in a rotational direction opposite to the predetermined rotational drive direction being a control direction of the servomotor is acting, such a state is considered to be a state that wastefully consumes energy because of reasons such as abnormality, deterioration and the like. If such a state continues, deterioration of the rotary tool will be accelerated.

In view of the above, in an embodiment of the disclosure, to diagnose the load state of the servomotor, the detection part that detects the rotational direction of the torque acting on the servomotor and the determination part that determines whether or not the rotational direction of the torque detected by the detection part is consistent with the predetermined rotational drive direction are provided. And then the load index output part outputs the load index indicating the load state of the servomotor based on the determination result of the determination part.

In other words, when the rotational direction of the torque of the servomotor is inconsistent with the predetermined rotational drive direction being a rotational control direction, it is clear that an unnecessary force, i.e. a load, is applied to the servomotor, and therefore the determination of being consistent or inconsistent is not a relative but an absolute evaluation.

As a result, even if the user does not consider the thresholds of the normal state and the abnormal state, the load state of the servomotor can be diagnosed using the absolute threshold of whether or not the rotational control direction of the servomotor is consistent with the rotational direction of the torque.

Further, in this way, it is possible to confirm whether or not a torque in the same rotational direction as the intended rotational control direction is acting on the servomotor and to determine whether an unnecessary force, i.e. a load, is not applied in the present operation state of the servomotor. In addition, it is possible to determine whether or not the operation state of the servomotor is in the state which accelerates deterioration of the rotary tool.

Therefore, the embodiments of the disclosure provide the load state diagnosis device and the load state diagnosis method for the servomotor that can diagnose the present load state of the servomotor with an absolute evaluation index regardless of types of rotary tools, processing conditions and differences in machines.

In the load state diagnosis device for the servomotor according to an embodiment of the disclosure, the detection part can detect the rotational direction of the torque by measuring a command current value for the servomotor.

When the servomotor is in a range under a rated torque, the torque-current characteristic is in a proportional relationship. As a result, the rotational direction of the torque can be detected by measuring a command current value of the servomotor.

In the load state diagnosis device for the servomotor according to an embodiment of the disclosure, the load index output part can measure the occurrence frequency of a state in which the rotational direction of the torque is inconsistent with the predetermined rotational drive direction for a certain period and output the load index based on the occurrence frequency.

As a result, since the occurrence frequency of the state in which a control opposite to the intended control direction is applied is set as the load index, the user does not have to consider the thresholds of the normal state and the abnormal state.

In addition, by monitoring the occurrence frequency of a torque acting in a rotational direction opposite to the rotational control direction of the servomotor as the direct load index of the servomotor, it is possible to easily determine whether or not the servomotor is in an overload state.

In the load state diagnosis device for the servomotor according to an embodiment of the disclosure, the load index output part can calculate an integrated value of a period of a state in which the rotational direction of the torque is inconsistent with the predetermined rotational drive direction and output the load index based on the integrated value.

As the integrated value of the number of current pulses applied with a torque in a rotational direction opposite to the rotational control direction of the servomotor increases, the probability of failures of the servomotor increases. Therefore, for example, by obtaining in advance the correlation between the integrated value of the period in the state in which the rotational direction of the torque is inconsistent with the predetermined rotational drive direction and the period when the servomotor has failures, it is easy to determine the timing of maintenance and inspection and the like. In this way, an appropriate maintenance such as reduction in maintenance costs of rotary tools can be realized.

In the load state diagnosis device for the servomotor according to an embodiment of the disclosure, a parameter setting part can be provided for setting a parameter related to the drive of the servomotor so that the load of the servomotor becomes smaller than the present load.

In this way, the parameter related to the drive of the servomotor can be set by the parameter setting part to make the load of the servomotor smaller than the present load.

In the load state diagnosis device for the servomotor according to an embodiment of the disclosure, the parameter setting part may include a control gain adjustment part for adjusting a control gain of a motor driver that controls the servomotor within a range in which the speed followability of the servomotor is tolerable.

In this way, the control gain of the motor driver that controls the servomotor is adjusted to serve as the parameter related to the drive of the servomotor. As a result, the load of the servomotor can be made smaller than the present load by adjusting the control gain.

According to an embodiment of the disclosure, there are provided the load state diagnosis device and the load state diagnosis method for the servomotor that can diagnose the present load state of the servomotor with an absolute evaluation index regardless of types of rotary tools, processing conditions and differences in machines.

Hereinafter, embodiments according to one aspect of the disclosure (hereinafter also referred to as "the present embodiment(s)") will be described with reference to the drawings.

Applicable Embodiment

First, an embodiment of a scene to which the disclosure is applicable will be described with reference to FIG. 1. FIG. 1 is a block diagram showing a configuration of a PLC 10 as a load state diagnosis device for a servomotor 2 according to an embodiment of the disclosure.

As shown in FIG. 1, the PLC 10 as the load state diagnosis device for the servomotor 2 according to an embodiment of the disclosure is the PLC 10 for diagnosing the load state of the servomotor 2 which rotationally drives a rotary tool 1 in a predetermined rotational drive direction at a constant speed and includes a detection part 12 that detects a rotational direction of a torque acting on the servomotor 2, a determination part 13 that determines whether or not the rotational direction of the torque detected by the detection part 12 is consistent with the predetermined rotational drive direction, and a load index output part 14 that outputs a load index indicating the load state of the servomotor 2 based on a determination result of the determination part 13.

In addition, a load state diagnosis method for the servomotor 2 according to an embodiment of the disclosure is the load state diagnosis method for diagnosing the load state of the servomotor 2 which rotationally drives the rotary tool 1 in the predetermined rotational drive direction at a constant speed and includes a detection process of detecting the rotational direction of the torque acting on the servomotor 2, a determination process of determining whether or not the detected rotational direction of the torque is consistent with the predetermined rotational drive direction, and a load index output process of outputting the load index indicating the load state of the servomotor 2 based on the determination result. In addition, the PLC 10 has a function as the load state diagnosis device according to an embodiment of the disclosure.

In other words, when the rotational direction of the torque of the servomotor 2 is inconsistent with the predetermined rotational drive direction being a rotational control direction, it is clear that an unnecessary force, i.e. a load, is applied to the servomotor 2, and therefore the determination of being consistent or inconsistent is not a relative but an absolute evaluation.

As a result, even if a user does not consider thresholds of a normal state and an abnormal state, it is possible to diagnose the load state of the servomotor 2 using an absolute threshold of whether or not the rotational control direction of the servomotor 2 is consistent with the rotational direction of the torque.

Further, in this way, it is possible to confirm whether or not a torque in the same rotational direction as the intended rotational control direction is acting on the servomotor 2 and to determine whether an unnecessary force, i.e. a load, is not applied in the present operation state of the servomotor 2. In addition, it is possible to determine whether or not the operation state of the servomotor 2 is in a state which accelerates deterioration of the rotary tool 1.

Therefore, the embodiments can provide the PLC 10 and the load state diagnosis method for the servomotor 2 that can diagnose the present load state of the servomotor 2 with an absolute evaluation index regardless of the type of the rotary tool 1, processing conditions and differences in machines.

Configuration Embodiment

Embodiments of the disclosure will be described below with reference to FIGS. 1 to 13E.

Figure 2:
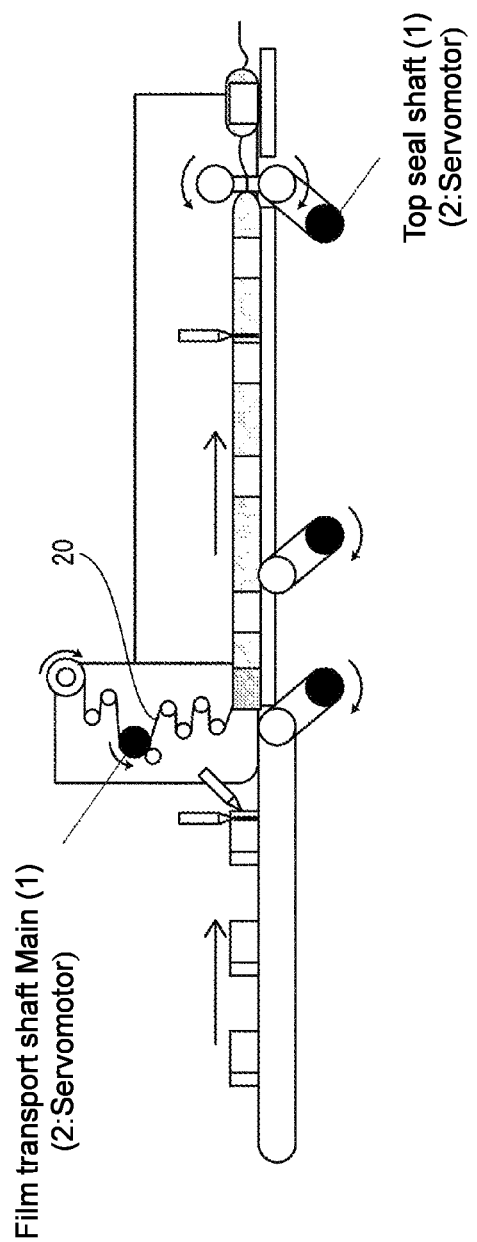
FIG. 2 is a diagram showing an embodiment of a rotary tool including the servomotor.

The overall configuration of the PLC 10 as the load state diagnosis device of the servomotor 2 according to an embodiment of the disclosure will be described with reference to FIGS. 1 and 2. FIG. 1 is a block diagram showing the configuration of the PLC 10 as the load state diagnosis device for the servomotor 2 according to an embodiment of the disclosure. FIG. 2 is a diagram showing an embodiment of the rotary tool 1 including the servomotor 2.

As shown in FIG. 1, the PLC 10 as the load state diagnosis device for the servomotor 2 according to an embodiment of the disclosure diagnoses the load state of the servomotor 2 which rotationally drives the rotary tool 1 in the predetermined rotational drive direction at a constant speed.

As shown in FIG. 2, the rotary tool 1 is, for example, used as a film transport shaft or a top seal shaft used in film transportation of packaging machines in factories and is rotationally driven by the servomotor 2. The rotary tool 1 such as a film transport shaft or a top seal shaft receives a load variation due to cutting of a seal 20 that is being transported. In addition, in the present embodiment, the rotary tool 1 is exemplified as a film transport shaft or a top seal shaft for description, but the rotary tool 1 is not limited thereto. In other words, the rotary tool 1 may be, for example, a rotary tool used as a machine tool rotationally driven by the servomotor 2, a rotary machine used in a factory and the like, or any type of rotary tools rotationally driven by the servomotor 2.

As shown in FIG. 1, the servomotor 2 is rotationally driven at a constant speed and in the predetermined rotational drive direction by a servo driver 3.

In the present embodiment, in order to function as the load state diagnosis device of the servomotor 2, the PLC 10 includes a drive control part 11, a detection part 12, a determination part 13, a load index output part 14, and a parameter setting part 15, as shown in FIG. 1. Each of these functional blocks is realized by a functional block installed on the PLC 10. Further, the load state diagnosis device is not limited to being realized by the PLC 10 but may be realized by any information processing device such as an IPC (Industrial PC Platform) and the like.

The drive control part 11 sends a control signal to the servo driver 3 so as to control the servomotor 2 at a constant speed and in the predetermined rotational drive direction.

Figure 3:
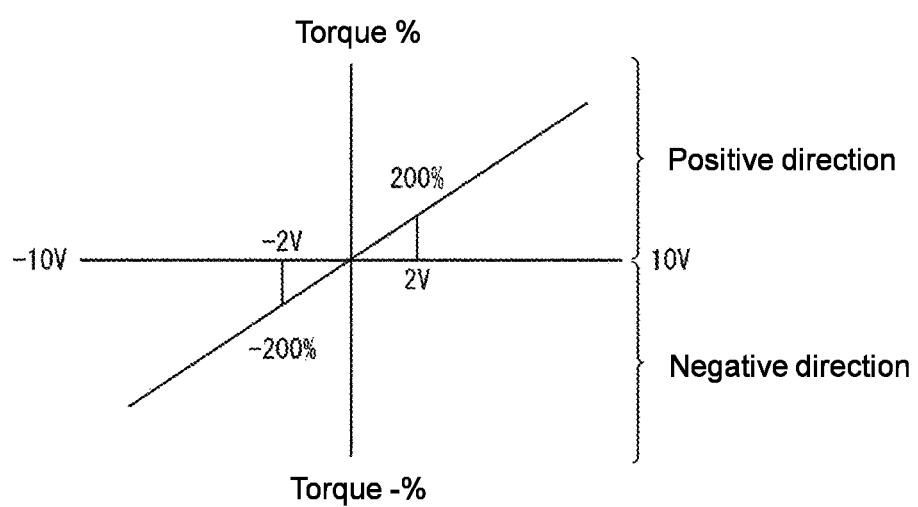
FIG. 3 is a graph showing a relationship between a command current value and a torque of the servomotor included in the rotary tool.

The detection part 12 detects the rotational direction of the torque acting on the servomotor 2. Here, a method of detecting the rotational direction of the torque of the servomotor 2 by the detection unit 12 will be described with reference to FIGS. 3, 4A and 4B. FIG. 3 is a graph showing a relationship between a command current value and the torque of the servomotor 2 included in the rotary tool 1. FIG. 4A is a diagram showing a torque waveform when the servomotor 2 is normal. FIG. 4B is a diagram showing a torque waveform when the servomotor 2 is abnormal.

As shown in FIG. 3, when the servomotor 2 is in a range under a rated torque, the torque-current characteristic is in a proportional relationship. As a result, a command value of the torque can be measured indirectly by measuring the command current value of the servomotor 2. Here, the positive and the negative of the torque represent rotational directions.

Here, when the rotational drive direction being the control direction of the servomotor 2 is inconsistent with the rotational direction of the torque, it is a state in which a torque opposite to the control direction is applied, and this state is considered to be wastefully consuming energy because of reasons such as abnormality, deterioration and the like.

Therefore, in the present embodiment, when the rotational drive direction being the control direction of the servomotor 2 is consistent with the rotational direction of the torque, it is determined as a normal state. On the other hand, when the rotational drive direction being the control direction of the servomotor 2 is opposite to the rotational direction of the torque, it is determined as an abnormal state.

For example, in the normal state in which the rotational drive direction being the control direction of the servomotor 2 is consistent with the rotational direction of the torque, pulse data of the current value shown in FIG. 4A is obtained. In other words, in FIG. 4A, the pulse data of the current value of the rotational drive direction being the control direction of the servomotor 2 is negative, the pulse data of the current value in the rotational direction of the torque is also negative. This state indicates that the torque is acting only in the control direction.

In contrast, in the abnormal state in which the rotational drive direction being the control direction of the servomotor 2 is opposite to the rotational direction of the torque, pulse data of the current value shown in FIG. 4B is obtained. In other words, in FIG. 4B, the pulse data of the current value of the rotational drive direction being the control direction of the servomotor 2 is negative, the pulse data of the current value in the rotational direction of the torque is periodically positive. Therefore, in the abnormal state shown in FIG. 4B, it is possible to discern that the rotational drive direction being the control direction of the servomotor 2 is opposite to the rotational direction of the torque and that a load is acting on the servomotor 2.

As shown in FIG. 1, in the present embodiment, the determination part 13 and the load index output part 14 are provided in the PLC 10. The determination part 13 determines whether or not the rotational direction of the torque detected by the detection part 12 is consistent with the predetermined rotational drive direction being the control direction.

Further, the load index output part 14 outputs the load index indicating the load state of the servomotor 2 based on the determination result of the determination part 13. In other words, in the present embodiment, by monitoring the load index which is a direct load of the servomotor 2 outputted by the load index output part 14, for example, maintenance and inspection costs of the rotary tool 1 can be reduced.

In the present embodiment, the load index output part 14 may, for example, output the frequency of a force acting in the opposite direction to the control direction for a certain period as the load index. Specifically, the load index output part 14 may output the number of current pulses or the number of measured current pulses in the opposite direction to the control direction as the load index.

In the present embodiment, the load index is not necessarily limited to the frequency of a force acting in the opposite direction to the control direction for a certain period. For example, as the integrated value of the number of current pulses applied with a torque in a rotational direction opposite to the rotational control direction of the servomotor increases, the probability of failures of the servomotor increases. Therefore, in the present embodiment, the integrated value of the period of the state in which the rotational direction of the torque is inconsistent with the predetermined rotational drive direction may be outputted as the load index.

In this case, by obtaining in advance the correlation between the integrated value of the period of the state in which the rotational direction of the torque is inconsistent with the predetermined rotational drive direction and the period when the servomotor 2 has failures, it is easy to determine the timing of maintenance and inspection and the like.

Figure 5:
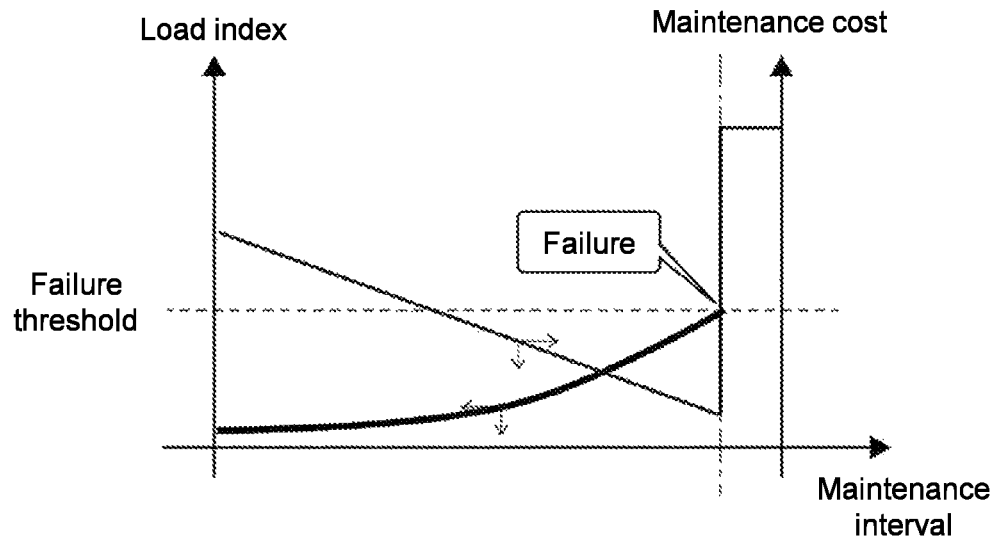
FIG. 5 is a graph showing a relationship between a maintenance interval of the rotary tool and a load index and a maintenance cost.

FIG. 5 is a graph showing a relationship between a maintenance interval and a load index and a maintenance cost. In addition, in FIG. 5, the bold solid line shows the relationship between the maintenance interval and the load index, and the thin solid line shows the relationship between the maintenance interval and the maintenance cost.

As shown in FIG. 5, as the maintenance interval of the rotary tool 1 increases, the load index gradually increases. The load index continues to increase until a failure occurs.

In this case, when the rotary tool 1 is left unmaintained, the maintenance cost simply decreases linearly as the maintenance interval increases until a failure occurs.

On the other hand, when the rotary tool 1 exceeds the failure threshold and has a failure, the maintenance cost rises sharply. In other words, when a failure occurs, a huge cost is required for restoration.

Therefore, as described above, by monitoring the load index which is the direct load of the servomotor 2 through the load index output part 14 and frequently checking and adjusting the rotary tool 1, maintenance and inspection costs of the rotary tool 1 can be reduced.

Figure 6:
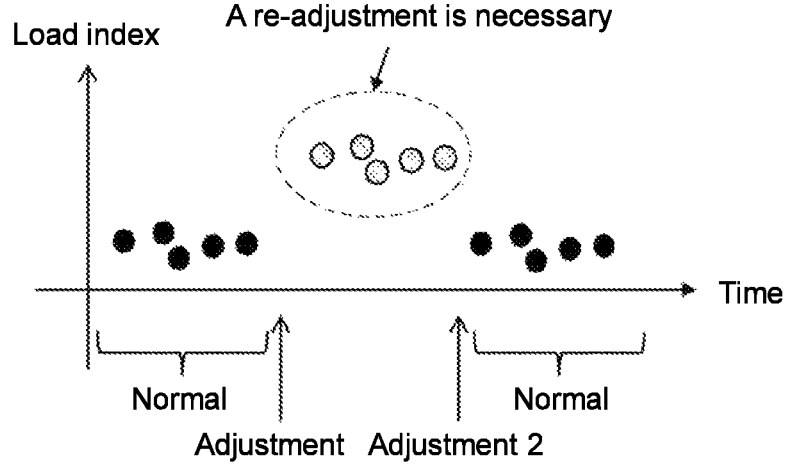
FIG. 6 is a schematic diagram showing the situation of checking whether an adjustment is good or not when the rotary tool is adjusted to an operating state different from the present state by comparing the load index of the servomotor in the normal state with the load index after the adjustment.

FIG. 6 is a schematic diagram showing the situation of checking whether an adjustment is good or not when the rotary tool 1 is adjusted to an operating state different from the present state by comparing the load index of the servomotor 2 in the normal state with the load index after the adjustment.

As shown in FIG. 6, the rotary tool 1 may be adjusted to an operating state different from the present state. In this case, it is necessary to confirm whether or not a load is applied to the servomotor 2 in a first adjustment 1. In the present embodiment, whether the adjustment 1 is good or not can be checked by comparing the load index of the servomotor 2 in the normal state with the load index after the adjustment. At this time, if it is determined that a load is acting on the servomotor 2 compared with the normal state due to a bad adjustment (maintenance) of the rotary tool 1, a second adjustment 2 is necessary. In this case, it is possible to set the load of the servomotor 2 to the state of a normal value by checking whether a load is acting on the servomotor 2 after the second adjustment 2 is performed. In this way, by diagnosing the load state of the servomotor 2, the servomotor 2 can be maintained in a normal driving state, and the maintenance cost can also be reduced.

Here, an adjustment method when the servomotor 2 is in the abnormal state may be, for example, to grease up the rotary tool 1 and to adjust the position where the rotary tool 1 is in contact with rotated members.

Alternatively, the abnormal state of the servomotor 2 may be restored to the normal state by changing a control method of the servomotor 2. Specifically, a control parameter of the servomotor 2 may be adjusted. The adjustment of the control parameter is, for example, the adjustment of the control gain of the servomotor 2 because the load of the servomotor 2 can be reduced easily by adjusting the control gain of the servomotor 2. It should be noted that in the PLC 10 according to the disclosure, the control parameter is not limited to the control gain, and other control parameters may be adjusted.

As shown in FIG. 1, a parameter related to the control gain is set through a control gain adjustment part 15a of the parameter setting part 15.

Hereinafter, a method of restoring the abnormal state of the servomotor 2 to the normal state by changing the control gain of the servomotor 2 will be described in detail.

Figure 7A:
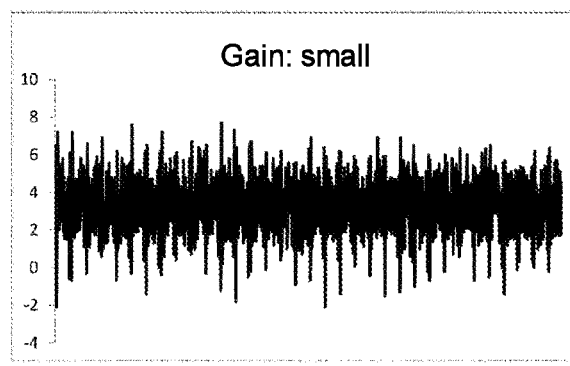
FIG. 7A is a chart showing a torque command value when the control gain of the servomotor is set to a small value.
Figure 7B:
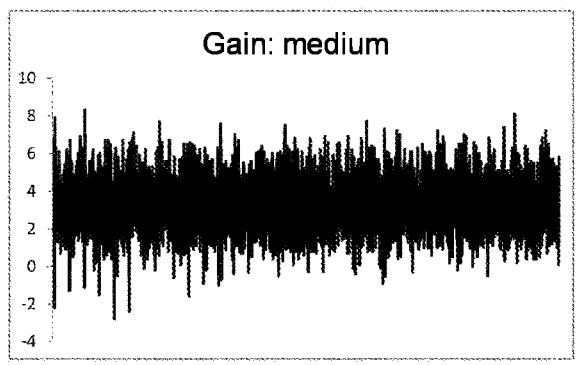
FIG. 7B is a chart showing the torque command value when the control gain of the servomotor is set to a medium value.
Figure 7C:
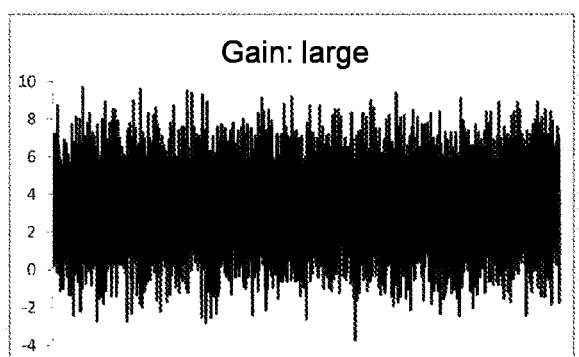
FIG. 7C is a chart showing the torque command value when the control gain of the servomotor is set to a large value.
Figure 8A:
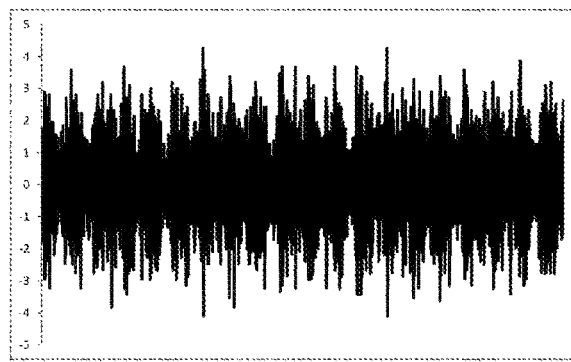
FIG. 8A is a chart showing a speed measurement value (speed command value) when the control gain of the servomotor is set to a small value.
Figure 8B:
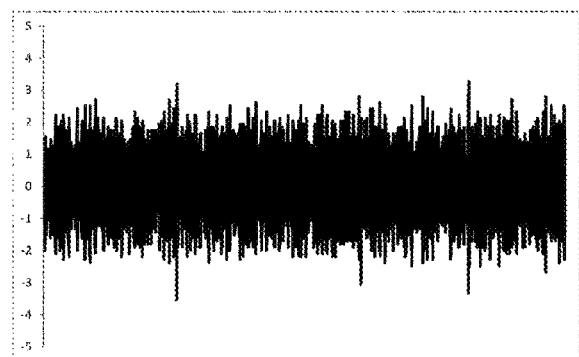
FIG. 8B is a chart showing the speed measurement value (speed command value) when the control gain of the servomotor is set to a medium value.
Figure 8C:
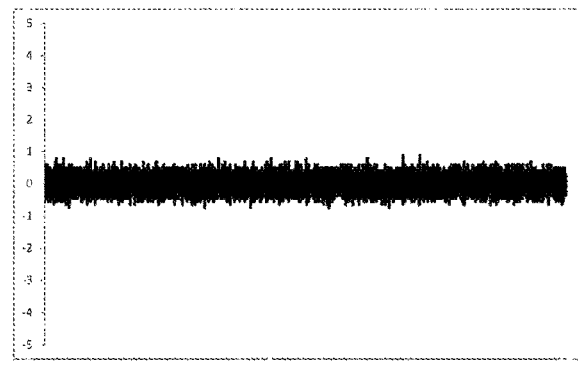
FIG. 8C is a chart showing the speed measurement value (speed command value) when the control gain of the servomotor is set to a large value.

First, with reference to FIGS. 7A, 7B and 7C, FIGS. 8A, 8B and 8C and FIG. 9, the relationship between the state of the control gain of the servomotor 2 and a speed measurement value of the servomotor 2 will be explained. FIG. 7A is a chart showing a torque command value when the control gain of the servomotor 2 is set to a small value, and FIG. 7B is a chart showing the torque command value when the control gain of the servomotor 2 is set to a medium value, and FIG. 7C is a chart showing the torque command value when the control gain of the servomotor 2 is set to a large value. FIG. 8A is a chart showing the speed measurement value (speed command value) when the control gain of the servomotor 2 is set to a small value, and FIG. 8B is a chart showing the speed measurement value (speed command value) when the control gain of the servomotor is set to a medium value, and FIG. 8C is a chart showing the speed measurement value (speed command value) when the control gain of the servomotor is set to a large value. FIG. 9 is a diagram showing an embodiment of the relationship between the values of the control gain of the servomotor 2 and the speed standard deviation and the load index of the servomotor 2 for different values.

As shown in FIGS. 7A, 7B, and 7C, it is known that, by increasing the control gain of the servomotor 2 from small, medium to large values, the speed deviation value of the speed measurement value (speed command value) at that time decreases as shown in FIGS. 8A, 8B, and 8C. However, as shown in FIG. 9, when the control gain of the servomotor 2 is increased from small, medium to large values, the load index does not necessarily decrease in proportion to the speed measurement value (speed command value). That is, the load index is 91.2 when the control gain of the servomotor 2 is small, and the load index is 46.8 when the control gain of the servomotor 2 is medium, and the load index is 287.1 when the control gain of the servomotor 2 is large. Consequently, by increasing the control gain of the servomotor 2 to "large", the speed standard deviation of the speed measurement value (speed command values) decreases to 0.2, while the load index increases to 287.1. FIG. 9 shows a state in the vicinity of x in FIG. 13C described below.

Figure 10:
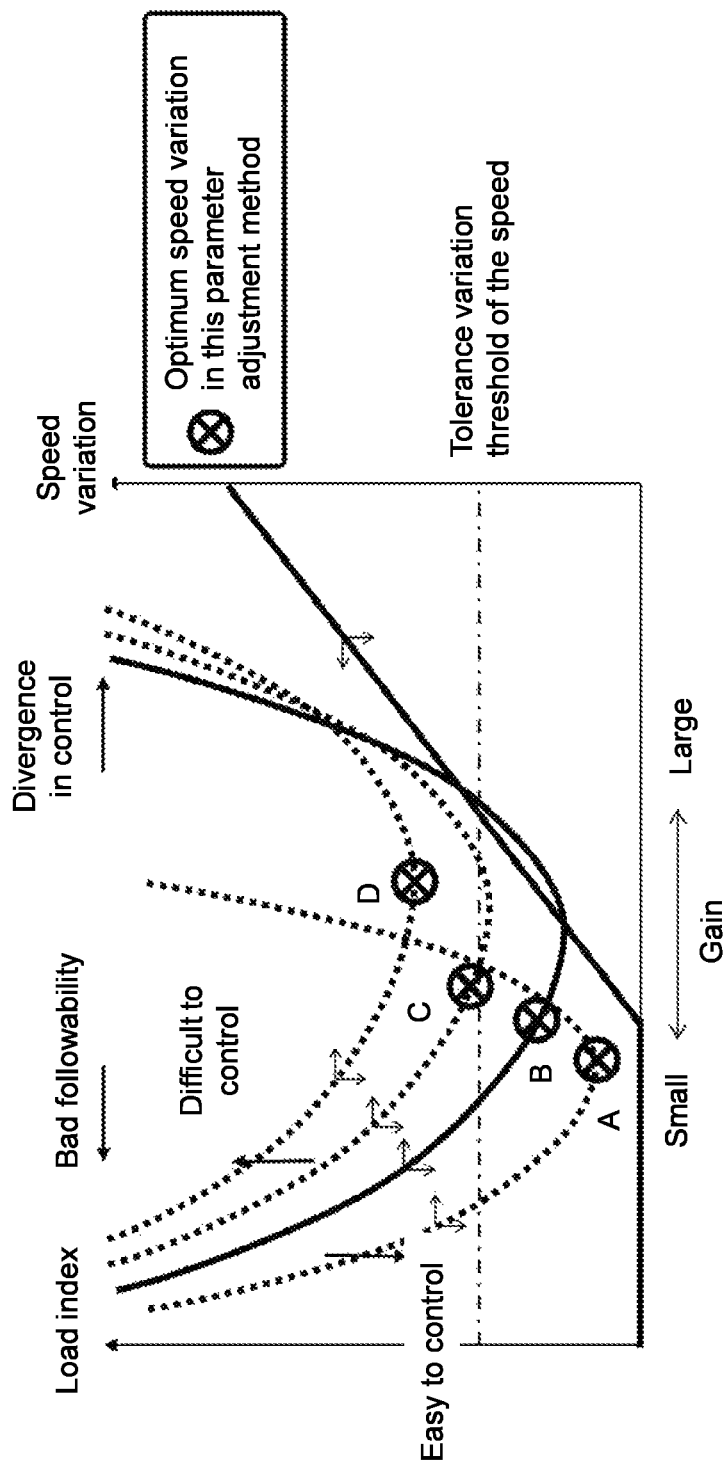
FIG. 10 is a graph showing an embodiment of the relationship among the control gain, the load index, and the speed variation of the servomotor.

Therefore, it is understood that the relationship between the control gain of the servomotor 2 and the load index is not simply a proportional or inversely proportional relationship. Specifically, an embodiment of the relationship between the control gain of the servomotor 2 and the load index is shown in FIG. 10. FIG. 10 is a graph showing an embodiment of the relationship among the control gain, the load index, and the speed variation of the servomotor 2. In addition, in FIG. 10, the bold straight line shows the relationship between the value of the control gain and the load index, and the bold curve shows the relationship between the value of the control gain and the speed variation.

As shown in FIG. 10, the relationship between the control gain of the servomotor 2 and the speed variation is indicated by a curve having a minimum value. Therefore, when the control gain of the servomotor 2 is adjusted, the following method is adopted. Further, A to D shown in FIG. 10 correspond to the following A to D.

A When minimum variation can be realized with the load index 0

The control gain with no load on the servomotor 2, with no divergence in speed control, with good followability and with the minimum speed variation is used.

B When minimum variation cannot be realized with load index 0, but tolerance variation is satisfied with load index 0

In the state where there is no load on the servomotor 2, the control gain with least divergence in speed control and with good followability is used.

C When the tolerance variation cannot be satisfied with the load index 0 but there is a control gain that satisfies the tolerance variation In the state where the speed variation is within the tolerance range, the control gain that minimizes the load on the servomotor 2 is used.

D When there is no control gain that satisfies the tolerance variation

The control gain with the minimum speed variation is used.

Figure 11:
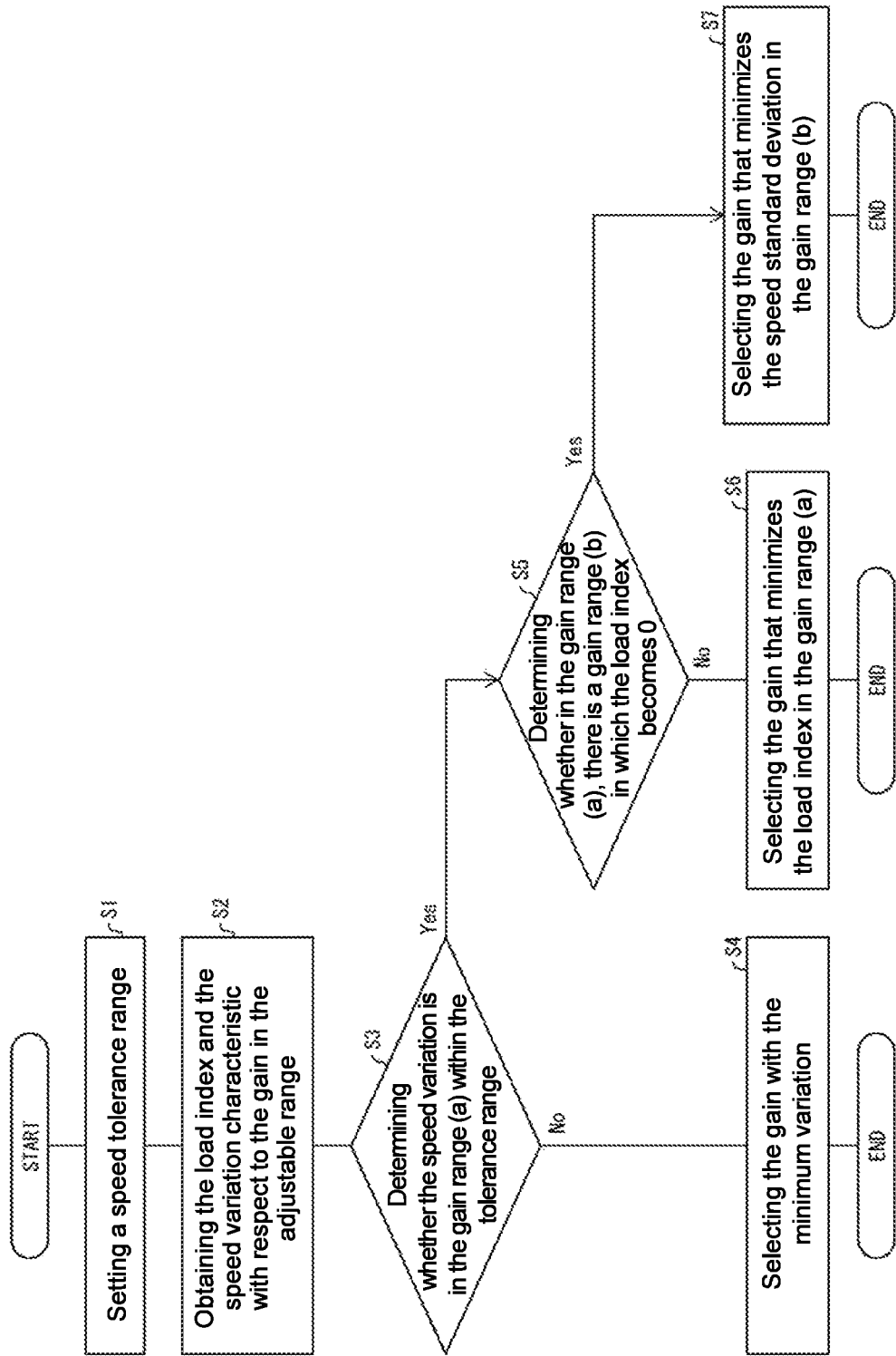
FIG. 11 is a flowchart showing an adjustment operation of the control gain of the servomotor.
Figure 12A:
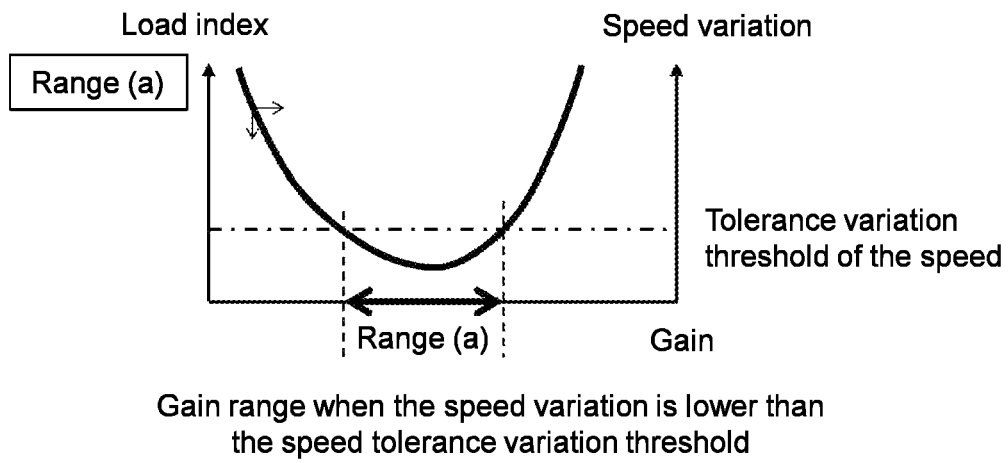
FIG. 12A is a diagram showing a control gain range (a) when the speed variation of the servomotor is lower than a speed tolerance threshold.
Figure 12B:
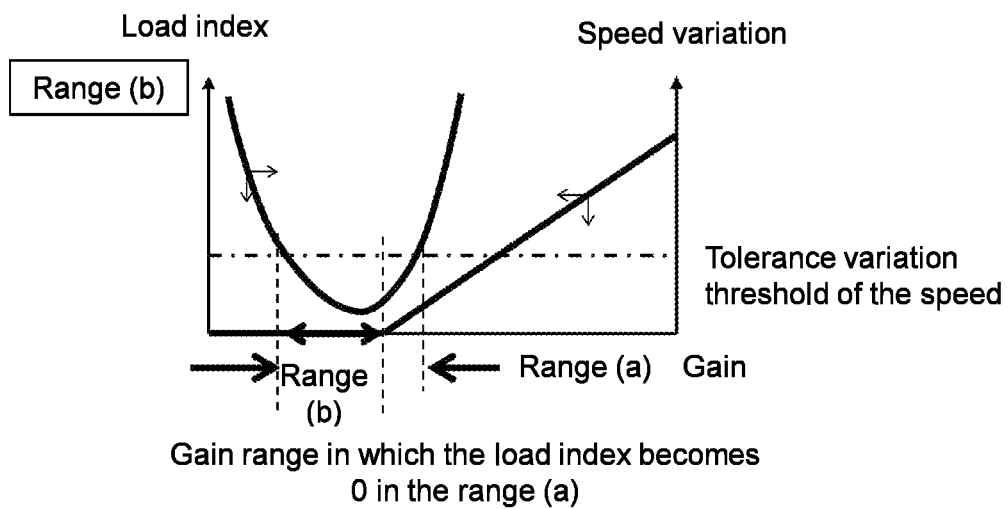
FIG. 12B is a diagram showing that in the control gain range (a), there is a control gain range (b) in which the load index becomes 0.
Figure 13A:
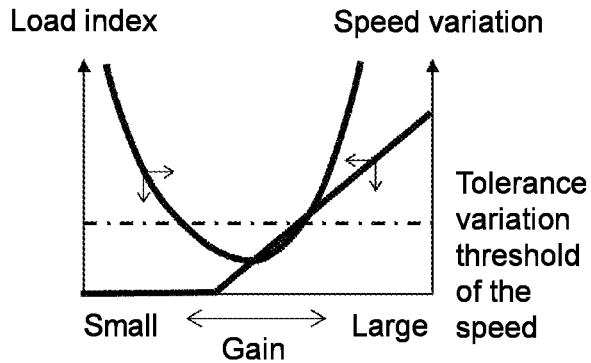
FIG. 13A is a graph showing the load index and a speed variation characteristic with respect to the control gain in a presently adjustable range.
Figure 13B:
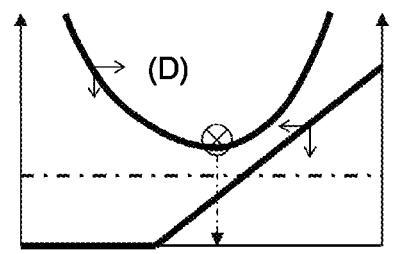
FIG. 13B is a graph showing the load index and the speed variation characteristic with respect to the control gain when the control gain shown in D of FIG. 10 is selected.
Figure 13C:
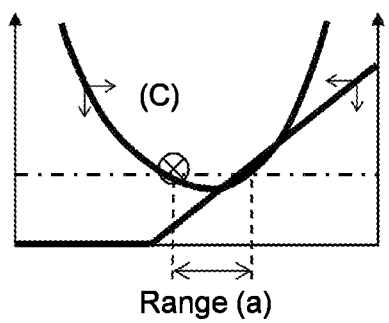
FIG. 13C is a graph showing the load index and the speed variation characteristic with respect to the control gain when the control gain shown in C of FIG. 10 is selected.
Figure 13D:
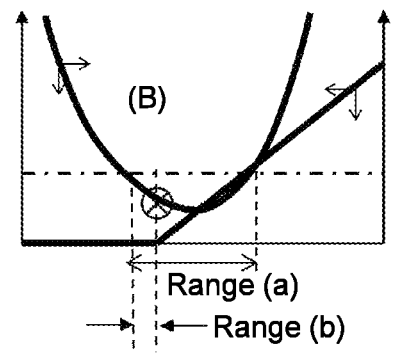
FIG. 13D is a graph showing the load index and the speed variation characteristic with respect to the control gain when the control gain shown in B of FIG. 10 is selected.
Figure 13E:
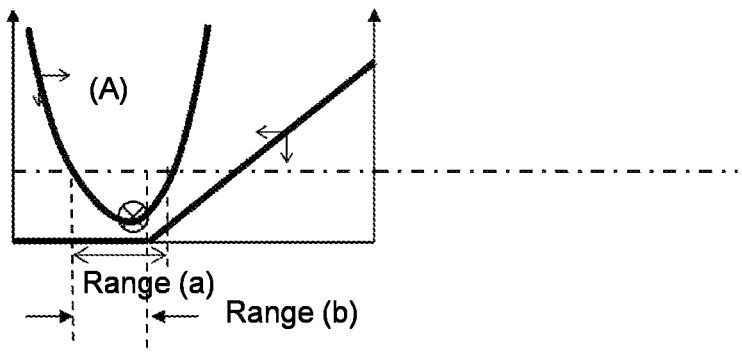
FIG. 13E is a graph showing the load index and the speed variation characteristic with respect to the control gain when the control gain shown in A of FIG. 10 is selected.

Based on the basic concepts of adjusting the control gain of the servomotor 2 as described above, a specific adjustment operation of the control gain of the servomotor 2 will be described with reference to FIGS. 11 to 13E. FIG. 11 is a flowchart showing an adjustment operation of the control gain of the servomotor 2. FIG. 12A is a diagram showing a control gain range (a) when the speed variation of the servomotor 2 is lower than a speed tolerance threshold. FIG. 12B is a diagram showing that in the control gain range (a), there is a control gain range (b) in which the load index becomes 0. FIG. 13A is a graph showing the load index and the speed variation characteristic with respect to the control gain in a presently adjustable range. FIG. 13B is a graph showing the load index and the speed variation characteristic with respect to the control gain when the control gain shown in D of FIG. 10 is selected. FIG. 13C is a graph showing the load index and the speed variation characteristic with respect to the control gain when the control gain shown in C of FIG. 10 is selected. FIG. 13D is a graph showing the load index and the speed variation characteristic with respect to the control gain when the control gain shown in B of FIG. 10 is selected. FIG. 13E is a graph showing the load index and the speed variation characteristic with respect to the control gain when the control gain shown in A of FIG. 10 is selected.

As shown in FIG. 11, when the control gain of the servomotor 2 is adjusted, first a speed tolerance range is set (S1). Then, as shown in FIG. 13A, the load index and the speed variation characteristic with respect to the control gain in a presently adjustable range are obtained (S2). At this time, whether or not the speed variation is in the gain range (a) within the tolerance range is determined (S3). Then, if the speed variation is not in the gain range (a) within the tolerance range, the control gain with the minimum variation is selected (S4). In this case, specifically, it is preferable to select the point indicated by x in FIG. 13B.

On the other hand, if it is determined in S3 that the speed variation is in the gain range (a) within the tolerance range, it is determined whether or not in the gain range (a), there is a gain range (b) in which the load index becomes 0 (S5). If in the gain range (a), there is not a gain range (b) in which the load index becomes 0, then the control gain that minimizes the load index in the gain range (a) is selected (S6). In this case, specifically, it is preferable to select the point indicated by x in FIG. 13C.

On the other hand, if it is determined in S5 that in the gain range (a), there is a gain range (b) in which the load index becomes 0, the control gain that minimizes the speed standard deviation in the gain range (b) is selected (S7). In this case, specifically, it is preferable to select the point indicated by x in FIGS. 13D and 13E.

By selecting the above-described control gain, it is possible to select a control gain with a small load as the control parameter.

In this way, the PLC 10 as the load state diagnosis device for the servomotor 2 according to the present embodiment diagnoses the load state of the servomotor 2 which rotationally drives the rotary tool 1 in the predetermined rotational drive direction at a constant speed. For this, the PLC 10 includes the detection part 12 that detects the rotational direction of the torque acting on the servomotor 2, the determination part 13 that determines whether or not the rotational direction of the torque detected by the detection part 12 is consistent with the predetermined rotational drive direction, and the load index output part 14 that outputs the load index indicating the load state of the servomotor 2 based on the determination result of the determination part 13.

Further, the load state diagnosis method for the servomotor 2 according to the present embodiment includes the detection process of detecting the rotational direction of the torque acting on the servomotor 2, the determination process of determining whether or not the detected rotational direction of the torque is consistent with the predetermined rotational drive direction, and the load index output process of outputting the load index indicating the load state of the servomotor 2 based on the determination result.

In other words, when the rotational direction of the torque of the servomotor 2 is inconsistent with the predetermined rotational drive direction being the rotational control direction, it is clear that an unnecessary force, i.e. a load, is applied to the servomotor 2, and therefore the determination of being consistent or inconsistent is not a relative but an absolute evaluation.

As a result, even if the user does not consider the thresholds of the normal state and the abnormal state, it is possible to diagnose the load state of the servomotor 2 using the absolute threshold of whether or not the rotational control direction of the servomotor 2 is consistent with the rotational direction of the torque.

Further, in this way, it is possible to confirm whether or not a torque in the same rotational direction as the intended rotational control direction is acting on the servomotor 2 and to determine whether an unnecessary force, i.e. a load, is not applied in the present operation state of the servomotor 2. In addition, it is possible to determine whether or not the operation state of the servomotor 2 is in a state which accelerates deterioration of the rotary tool 1.

Therefore, the embodiments provide the load state diagnosis device and the load state diagnosis method for the servomotor 2 that can diagnose the present load state of the servomotor 2 with an absolute evaluation index regardless of the type of the rotary tool 1, processing conditions and differences in machines.

Further, in the PLC 10 for the servomotor 2 according to the present embodiment, the detection part 12 may detect the rotational direction of the torque by measuring the command current value for the servomotor 2.

When the servomotor 2 is in a range under a rated torque, the torque-current characteristic is in a proportional relationship. As a result, the rotational direction of the torque can be detected by measuring a command current value of the servomotor 2.

In addition, in the PLC 10 for the servomotor 2 according to the present embodiment, the load index output part 14, for example, measures the occurrence frequency of a state in which the rotational direction of the torque is inconsistent with the predetermined rotational drive direction for a certain period and outputs the load index based on the occurrence frequency.

As a result, since the occurrence frequency of the state in which a control opposite to the intended control direction is applied is set as the load index, the user does not have to consider the thresholds of the normal state and the abnormal state.

In addition, by monitoring the occurrence frequency of the torque acting in the rotational direction opposite to the rotational control direction of the servomotor 2 as the direct load index of the servomotor 2, it is easy to determine whether or not the servomotor 2 is in an overload state.

In addition, in the PLC 10 for the servomotor 2 according to the present embodiment, the load index output part 14, for example, calculates the integrated value of the period of the state in which the rotational direction of the torque is inconsistent with the predetermined rotational drive direction and outputs the load index based on the integrated value.

As the integrated value of the number of current pulses applied with the torque in the rotational direction opposite to the rotational control direction of the servomotor 2 increases, the probability of failures of the servomotor 2 increases. Therefore, by obtaining in advance the correlation between the integrated value of the period of the state in which the rotational direction of the torque is inconsistent with the predetermined rotational drive direction and the period when the servomotor 2 has failures, it is easy to determine the timing of maintenance and inspection and the like. In this way, an appropriate maintenance such as reduction in maintenance costs of rotary tools can be realized.

In the PLC 10 for the servomotor 2 according to the present embodiment, the parameter setting part 15 is provided for setting the parameter related to the drive of the servomotor 2 so that the load of the servomotor 2 becomes smaller than the present load.

In this way, the parameter related to the drive of the servomotor 2 can be set through the parameter setting part 51 to make the load of the servomotor 2 smaller than the present load.

In addition, in the PLC 10 for the servomotor 2 according to the present embodiment, the parameter setting part 15 includes the control gain adjustment part 15*a* for adjusting a control gain of a motor driver that controls the servomotor 2 within a range in which the speed followability of the servomotor 2 is tolerable.

In this way, the load of the servomotor 2 can be made smaller than the present load by adjusting the control gain.

It should be noted that the disclosure is not limited to the above-described embodiments, and various modifications are possible within the scope specified in the claims, and embodiments achieved by appropriately combining technical means disclosed in different embodiments respectively are also included in the technical scope of the disclosure. Furthermore, by combining technical means disclosed in each embodiment, new technical features may be formed.

What is claimed is:

1. A load state diagnosis device for a servomotor which diagnoses a load state of the servomotor rotationally driving a rotary tool in a predetermined rotational drive direction at a constant speed, comprising:
    a detection part that detects a rotational direction of a torque acting on the servomotor;
    a determination part that determines whether or not the rotational direction of the torque detected by the detection part is consistent with the predetermined rotational drive direction; and
    a load index output part that outputs a load index indicating the load state of the servomotor based on a determination result of the determination part, wherein the load index output part calculates an integrated value of a period of a state in which the rotational direction of the torque is inconsistent with the predetermined rotational drive direction and outputs the load index based on the integrated value.

2. The load state diagnosis device for the servomotor according to claim 1, the detection part detects the rotational direction of the torque by according to a command current value for the servomotor.

3. The load state diagnosis device for the servomotor according to claim 1, the load index output part measures an occurrence frequency of a state in which the rotational direction of the torque is inconsistent with the predetermined rotational drive direction for a certain period and outputs the load index based on the occurrence frequency.

4. The load state diagnosis device for the servomotor according to claim 2, the load index output part measures an occurrence frequency of a state in which the rotational direction of the torque is inconsistent with the predetermined rotational drive direction for a certain period and outputs the load index based on the occurrence frequency.

5. The load state diagnosis device for the servomotor according to claim 2, the load index output part calculates an integrated value of a period of a state in which the rotational direction of the torque is inconsistent with the predetermined rotational drive direction and outputs the load index based on the integrated value.

6. The load state diagnosis device for the servomotor according to claim 1, a parameter setting part is provided for setting a parameter related to drive of the servomotor so that a load of the servomotor becomes smaller than a present load.

7. The load state diagnosis device for the servomotor according to claim 2, a parameter setting part is provided for setting a parameter related to drive of the servomotor so that a load of the servomotor becomes smaller than a present load.

8. The load state diagnosis device for the servomotor according to claim 3, a parameter setting part is provided for setting a parameter related to drive of the servomotor so that a load of the servomotor becomes smaller than a present load.

9. The load state diagnosis device for the servomotor according to claim 4, a parameter setting part is provided for setting a parameter related to drive of the servomotor so that a load of the servomotor becomes smaller than a present load.

10. The load state diagnosis device for the servomotor according to claim 5, a parameter setting part is provided for setting a parameter related to drive of the servomotor so that a load of the servomotor becomes smaller than a present load.

11. The load state diagnosis device for the servomotor according to claim 6, the parameter setting part comprises a control gain adjustment part for adjusting a control gain of a motor driver that controls the servomotor within a range in which a speed followability of the servomotor is tolerable.

12. The load state diagnosis device for the servomotor according to claim 7, the parameter setting part comprises a control gain adjustment part for adjusting a control gain of a motor driver that controls the servomotor within a range in which a speed followability of the servomotor is tolerable.

13. The load state diagnosis device for the servomotor according to claim 8, the parameter setting part comprises a control gain adjustment part for adjusting a control gain of a motor driver that controls the servomotor within a range in which a speed followability of the servomotor is tolerable.

14. The load state diagnosis device for the servomotor according to claim 9, the parameter setting part comprises a control gain adjustment part for adjusting a control gain of a motor driver that controls the servomotor within a range in which a speed followability of the servomotor is tolerable.

15. The load state diagnosis device for the servomotor according to claim 10, the parameter setting part comprises a control gain adjustment part for adjusting a control gain of a motor driver that controls the servomotor within a range in which a speed followability of the servomotor is tolerable.

16. A load state diagnosis method for a servomotor which diagnoses a load state of the servomotor rotationally driving a rotary tool in a predetermined rotational drive direction at a constant speed, characterized in comprising:
    a detection process of detecting a rotational direction of a torque acting on the servomotor;
    a determination process of determining whether or not the detected rotational direction of the torque is consistent with the predetermined rotational drive direction; and
    a load index output process of outputting a load index indicating the load state of the servomotor based on a determination result, wherein an integrated value of a period of a state in which the rotational direction of the torque is inconsistent with the predetermined rotational drive direction is calculated and a load index based on the integrated value is outputted.

\* \* \* \* \*